(12) United States Patent
Fox et al.

(10) Patent No.: US 10,896,496 B2
(45) Date of Patent: Jan. 19, 2021

(54) DETERMINATION OF HIGH RISK IMAGES USING PEER-BASED REVIEW AND MACHINE LEARNING

(71) Applicant: International Business Machines Corporation, Armonk, NY (US)

(72) Inventors: Jeremy R. Fox, Georgetown, TX (US); Kelley Anders, East New Market, MD (US); Sonya Leech, Mulhuddart (IE); Jonathan Dunne, Dungarvan (IE)

(73) Assignee: International Business Machines Corporation, Armonk, NY (US)

( * ) Notice: Subject to any disclaimer, the term of this patent is extended or adjusted under 35 U.S.C. 154(b) by 97 days.

(21) Appl. No.: 16/052,157

(22) Filed: Aug. 1, 2018

(65) Prior Publication Data
US 2020/0043155 A1 Feb. 6, 2020

(51) Int. Cl.
*G06T 7/00* (2017.01)
*G06K 9/64* (2006.01)
*H04L 29/08* (2006.01)

(52) U.S. Cl.
CPC .............. *G06T 7/0002* (2013.01); *G06K 9/64* (2013.01); *H04L 67/306* (2013.01);
(Continued)

(58) Field of Classification Search
None
See application file for complete search history.

(56) References Cited

U.S. PATENT DOCUMENTS 8,385,971 B2  2/2013  Rhoads et al.
9,443,152 B2  9/2016  Atsmon et al.
(Continued)

FOREIGN PATENT DOCUMENTS

CN   106534680 A   3/2017
CN   104156819 B   8/2017
KR   20180028198 A  3/2018

OTHER PUBLICATIONS

Lamba et al., Me, Myself and My Killfie: Characterizing and Preventing Selfie Deaths, Nov. 2016, 9 pages.
(Continued)

*Primary Examiner* — David Perlman
(74) *Attorney, Agent, or Firm* — L. Jeffrey Kelly; Edell, Shapiro & Finnan, LLC

(57) ABSTRACT

Methods, systems, and computer readable media are provided for identifying photos such as selfies in which the individuals in the photo are in imminent danger. One or more profiles are generated, each profile associated with a corresponding first user of a networked system and pertaining to problematic conditions for image capture. An image of a second user is captured via an image capture device. The captured image of the second user is uploaded to the networked system. The captured image of the second user is compared to the generated one or more profiles to determine a score value for the captured image of the second user. A score value may be generated based upon a combination of scores from one or more of geolocation information, metadata analysis, and image processing and machine learning. The upload of the captured image of the second user is rejected in response to the score value satisfying a threshold indicating a presence of problematic conditions during capturing of the image of the second user.

17 Claims, 6 Drawing Sheets

(52) U.S. Cl.
CPC ............... *G06K 2209/27* (2013.01); *G06T 2207/20081* (2013.01); *G06T 2207/30168* (2013.01); *G06T 2207/30196* (2013.01); *H04L 67/10* (2013.01)

(56) References Cited

U.S. PATENT DOCUMENTS

| | | | |
|---|---|---|---|
| 10,043,376 B1* | 8/2018 | Poornachandran | G06N 5/04 |
| 2013/0151609 A1* | 6/2013 | Rubinstein | H04L 51/12 |
| | | | 709/204 |
| 2014/0111647 A1 | 4/2014 | Atsmon et al. | |
| 2016/0088286 A1 | 3/2016 | Forsythe et al. | |
| 2016/0134797 A1 | 5/2016 | Perez-Feliciano et al. | |
| 2018/0349502 A1* | 12/2018 | Maycock | G06F 16/24578 |
| 2018/0365028 A1* | 12/2018 | Hosabettu | H04M 1/72569 |
| 2019/0272724 A1* | 9/2019 | Greene | G08B 21/0205 |

OTHER PUBLICATIONS

Gee, Rachel, Marketing Week (2016), https://www.marketingweek.com/2016/10/26/as-mastercard-launches-an-ai-bot-research-suggests-consumers-prefer-human-interactions/ (accessed on Aug. 1, 2018).

* cited by examiner

DETERMINATION OF HIGH RISK IMAGES USING PEER-BASED REVIEW AND MACHINE LEARNING

BACKGROUND

1. Technical Field

Present invention embodiments relate to identification of high risk images, and more specifically, to using peer-based review and/or machine learning to identify high risk images and prevent display of such images on social media.

2. Discussion of the Related Art

In modern day society, individuals may take photos of themselves, known as selfies, for upload onto various social media sites. While most people take selfies without placing themselves in harm's way, some individuals take unnecessary chances, such as exposing themselves to extreme weather conditions, contacting dangerous animals, or climbing to extreme heights.

In some cases, individuals taking selfies have become involved in accidents that have resulted in injury.

SUMMARY

According to embodiments of the present invention, methods, systems and computer readable media are provided for identifying photos in which the user taking the photo or self-image appears to be in imminent danger. In some aspects, one or more profiles are generated, each profile associated with a corresponding first user of a networked system and pertaining to conditions for image capture. An image of a second user is captured via an image capture device. The captured image of the second user is uploaded to the networked system. The captured image of the second user is compared to the generated one or more profiles to determine a score value for the captured image of the second user. Upload of the captured image of the second user is rejected in response to the score value satisfying a threshold indicating a presence of problematic conditions during capturing of the image of the second user.

It is to be understood that the Summary is not intended to identify key or essential features of embodiments of the present disclosure, nor is it intended to be used to limit the scope of the present disclosure. Other features of the present disclosure will become easily comprehensible through the description below.

BRIEF DESCRIPTION OF THE DRAWINGS

Generally, like reference numerals in the various figures are utilized to designate like components. Through the more detailed description of some embodiments of the present disclosure in the accompanying drawings, the above and other objects, features and advantages of the present disclosure will become more apparent.

DETAILED DESCRIPTION

Present techniques leverage feedback from peer-based review by a user's social cohort, such as from social media, to generate profiles to determine whether an image, such as a selfie, is captured in the presence of problematic conditions. Additionally, a user's social cohort may classify images according to a level of risk to generate training data, and a machine learning system may be used to identify problematic conditions based on the training data. Photos that are determined to be in the presence of a problematic condition will not be uploaded to a social media site.

Present techniques provide a user with a peer-based review system with machine learning capabilities to determine if a selfie photograph includes a problematic condition that appears to place the user in imminent danger. These techniques leverage a user's social cohort to generate profiles, in order to promote responsible use of selfies and other forms of photography to minimize risk and harm to the user. The one or more profiles may serve as training data for the machine learning module.

Figure 1:
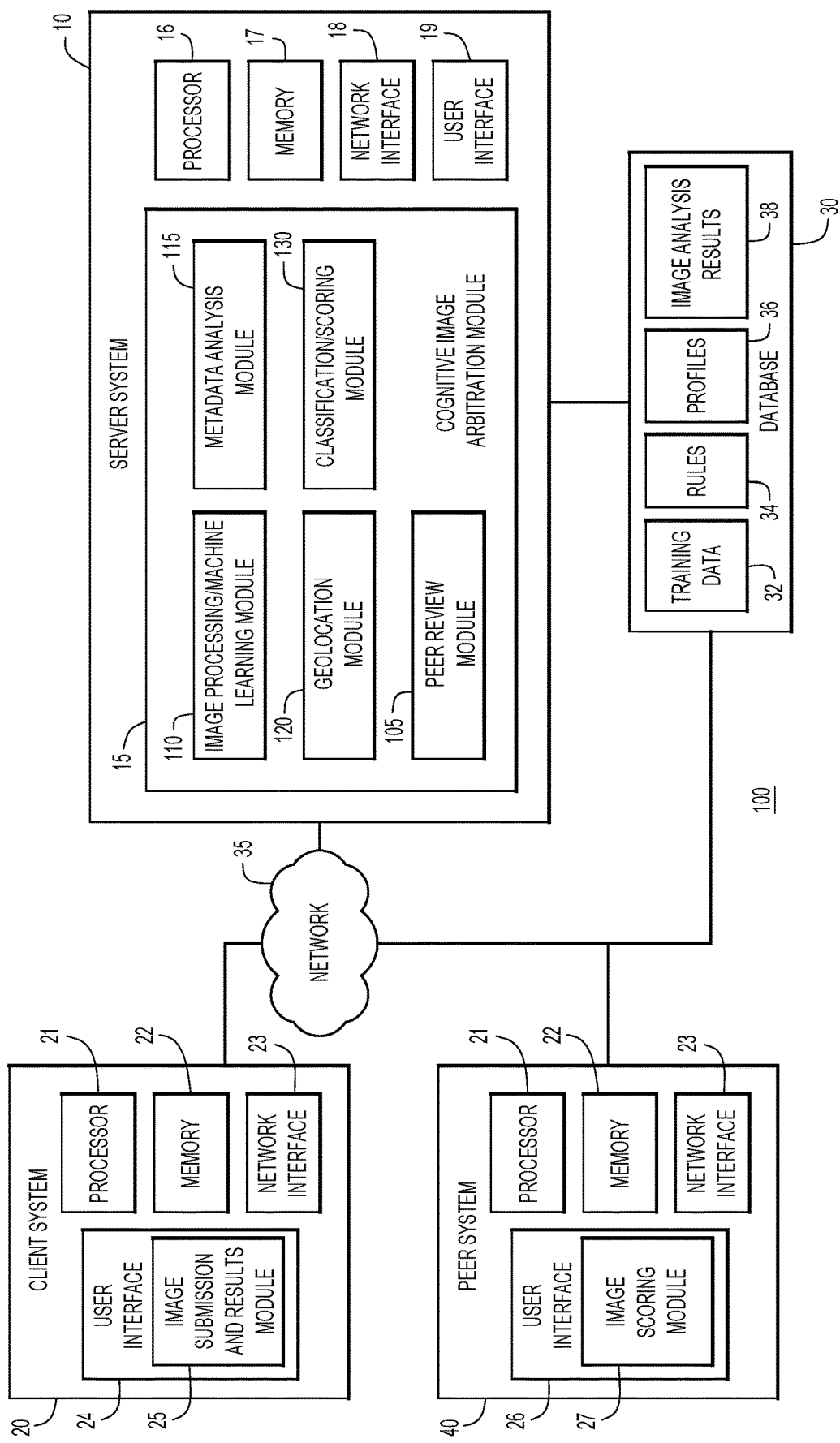
FIG. 1 is a block diagram of an example computing environment for identifying high risk images in accordance with embodiments of the present disclosure.

An example environment 100 for use with present invention embodiments is illustrated in FIG. 1. Specifically, the environment includes one or more server systems 10, one or more client or end-user systems 20, and one or more peer systems 40. Server systems 10, client systems 20, and peer systems 40 may be remote from each other and communicate over a network 35. The network may be implemented by any number of any suitable communications media, such as wide area network (WAN), local area network (LAN), Internet, Intranet, etc. Alternatively, server systems 10, client systems 20, and peer systems 40 may be local to each other, and communicate via any appropriate local communication medium, such as local area network (LAN), hardwire, wireless link, Intranet, etc.

Client systems 20 enable users to submit images, such as selfies, photographs of other individual(s), etc., for peer review of such images using peer system 40 and/or for analysis of such images by server systems 10. Server systems 10 comprise a cognitive image arbitration module 15 to determine whether images meet specified criteria for upload onto social media sites. A database system 30 may store various information for the analysis, such as training data 32, rules 34, profiles 36, image analysis results 38, etc.

Training data 32 may include training data sets for classification into various latent class model (LCM) risk categories, such as high risk LCM1, medium risk LCM2, and low risk LCM3 categories. Rules 34 may include users who are subject to different thresholds for determining problematic conditions or users who are excluded from analysis by the cognitive image arbitration module 15. Profiles 36 include profiles generated from peer system 40, based on classification of images by a user's social cohort. In some aspects, a profile associated with a corresponding first user includes one or more from a group of a list of keywords and sample images captured during a presence of problematic conditions. Image analysis results 38 may include results of analyzing a particular image, such as scoring, peer comments, classification into a category, etc.

The database system may be implemented by any conventional or other database or storage unit, may be local to or remote from server systems 10, client systems 20, and peer systems 40 and may communicate via any appropriate communication medium, such as local area network (LAN), wide area network (WAN), Internet, hardwire, wireless link, Intranet, etc. The client systems 20 may present a graphical user, such as a GUI, etc., or other interface 24, such as command line prompts, menu screens, etc., comprising an image submission and results module 25 that allow users to submit the desired images for analysis, and may receive reports including analysis results, such as score values, classification into a LCM risk category, a report stating whether or not the image meets criteria for upload, information for generating images that meet criteria, etc. Peer systems 40 may provide a graphical user, such as a GUI, etc., or other interface 26, such as command line prompts, menu screens, etc., comprising an image scoring module 27 that allows peers/social cohorts to score and/or classify an image into a LCM risk category. Image scoring module 27 may also receive information provided from the social cohort pertaining to reasons why the image is considered to be unsuitable for upload to a social media site, such as reasons for identifying a presence of a problematic condition, etc.

Server systems 10, client systems 20, and peer systems 40 may be implemented by any conventional or other computer systems preferably equipped with a display or monitor, a base, such as including at least one processor 16, 21 one or more memories 17, 22 and/or internal or external network interfaces or communications devices 18, 23, such as modem, network cards, etc., optional input devices, such as a keyboard, mouse or other input device, and any commercially available and custom software, such as server/communications software, cognitive image arbitration module 15, image submission module 25, image scoring module 27, browser/interface software, etc. Server system 10 may also comprise user interface 19 for configuration of the server system 10 and cognitive image arbitration module 15.

Alternatively, one or more client systems 20 may submit images to peer system 40 for image analysis. In this mode of operation, the client system 20 stores or has access to the images to be scored, training data 32, rules 34, profiles 36 and includes a cognitive image arbitration module 15 to analyze images to determine whether such images meet specified criteria for upload to social media sites. The graphical user, such as a GUI, etc. or other interface, such as command line prompts, menu screens, etc., solicits information from a corresponding peer system 40 pertaining to the desired images and analysis, and may provide reports to the user including image analysis results.

Cognitive image arbitration module 15 may include one or more modules or units to perform the various functions of present invention embodiments described herein. The various modules, such as peer review module 105, image processing/machine learning module 110, metadata analysis module 115, geolocation module 120, and classification/scoring module 130, etc., may be implemented by any combination of any quantity of software and/or hardware modules or units, and may reside within memory 17 of the server systems for execution by processor 16.

Peer review module 105 may receive photos from client system 20 for classification and scoring of photos, and may solicit peer system 40 for information pertaining to classification and scoring of photos. When the photo is classified and scored by a user of the peer system 40, the peer review module 105 may store the photographs and associated classifications and scores, along with any reasons for scoring in database 30, such as training data 32, rules 34, profiles 36, and/or image analysis results 38. Thus, peer review module 105 may generate one or more profiles 36 based on information provided by a user's cohort, wherein the one or more profiles pertain to conditions for image capture, such as a LCM risk category. This training data 32 may be used to generate a machine learning model to classify images into one of a plurality of LCM risk categories.

In general, different profiles may correspond to different risk categories. In some aspects, a profile associated with a first user may include one or more from a group of a list of keywords and sample images captured during a presence of a problematic condition(s). In this case, the profile may correspond to a high LCM1 risk category. In another example, a different profile may correspond to a low LCM3 risk category, containing one or more keywords or images from a group of a list of keywords and sample images captured during the absence of a problematic condition(s). A similar profile may be generated for a medium LCM1 risk category. The submitted image along with any associated metadata and/or geolocation information may be compared to these profiles during classification and scoring of the submitted image.

For example, a series of images may be presented for crowdsourcing/peer-based review via module 105 for a user's social cohort to mark as low, medium, or high risk of a problematic condition. This information may be used to generate a training data set for classifying the photos into a particular LCM risk category. Once the machine learning model meets specified performance criteria, the machine learning model may classify images submitted for upload into a LCM risk category in an automated or semi-automated manner.

Image processing/machine learning module 110 may apply image processing techniques and machine learning models to automatically or semi-automatically classify and score photos into one of a plurality of LCM risk categories. For example, the image may be compared to other photos that have been rejected for upload and/or to other photos that have been accepted for upload. Based on similarity to classified photos, the candidate photo may be assigned an image score value, indicating a likelihood of a problematic condition, such as risk to a user. In some aspects, photos that are classified in a medium LCM risk category, from receiving a score value between a low likelihood threshold value and a high likelihood threshold value, may be provided to peer system 40 for further peer-based review.

Machine learning models 110 may include inputs, weights, and classification algorithms that include but are not limited to a naïve Bayes classifier, a K means clustering algorithm, a support vector machine, an apriori model, a linear regression classifier, a logistic regression classifier, artificial neural networks, random forests, decision trees, and a nearest neighbor classifier. Inputs to the machine learning module may include any one or more outputs from geolocation module 120, metadata analysis module 115, image processing/machine learning module 110, and from peer review module 105. Weights may be determined during training of the machine learning model, for example, based on training data provided by peer review module 105.

Metadata analysis module 115 may analyze metadata associated with photos and this information may be incorporated into classification/scoring module 130. For example, hash tags and/or other tags associated with an image may be considered when determining whether a photo has a problematic condition. For example, a photo associated with a hash tag including terms such as "extreme stunt" or "daredevil" may receive a metadata score value greater than a threshold to classify the image into a high LCM1 risk category indicating a high likelihood of a problematic condition. (Alternatively, a photo associated with a hash tag including terms such as "extreme stunt" or "daredevil" may receive a metadata score value less than a threshold to classify the image into a high LCM1 risk category indicating a high likelihood of a problematic condition.) High risk photos may be associated with a high score value or a low score value, depending on how scoring is configured. Additionally, photos associated with names of people with a history of submitting high risk selfies may be automatically classified into a high LCM1 risk category.

In some aspects, rules 34 may include names of individuals assigned with custom thresholds for image classification. For example, individuals in high risk occupations, such as rescue personnel, may be exempted from analysis and classification into a LCM risk category. As another example, a user without a history of taking high risk selfies may be subject to a standard threshold for image classification and scoring, while a user with a history of taking high risk selfies may be subject to a customized threshold lower than the standard threshold. In this context, a standard threshold is used to classify images from a user without a prior history of photo rejections. In some cases, metadata analysis module 115 may generate a metadata score value which corresponds to the presence of a problematic condition. For example, in some embodiments, the metadata score value may be greater than (or less than) a threshold value when a problematic condition is detected based on metadata.

Geolocation module 120 may utilize rules 34 for evaluating location information associated with the submitted image to determine whether the submitted image is suitable for upload. For example, photos from an aerial view of a location with no known observation deck or other public access point may be considered to be dangerous and automatically assigned a geolocation score value to result in classification into a high LCM1 risk category. On the other hand, structures such as the Empire State building may be considered to be of low or intermediate risk, for example, due to presence of a known observation deck. Geolocation module 120 may generate a geolocation score value which corresponds to the presence of a problematic condition based on geolocation. For example, in some embodiments, the geolocation score value may be greater than (or less than) a threshold value when a problematic condition is detected.

Classification/scoring module 130 may classify and/or score photos based upon information provided from peer review module 105 and/or from image processing/machine learning module 110, metadata analysis module 115, and geolocation module 120 to generate a score value used to classify a photo in an LCM risk category. In some aspects, the score value may be an aggregate score value that is a combination of the metadata score value, the geolocation score value, and the image score value from comparison of the captured image to the images in the one or more profiles.

Figure 2:
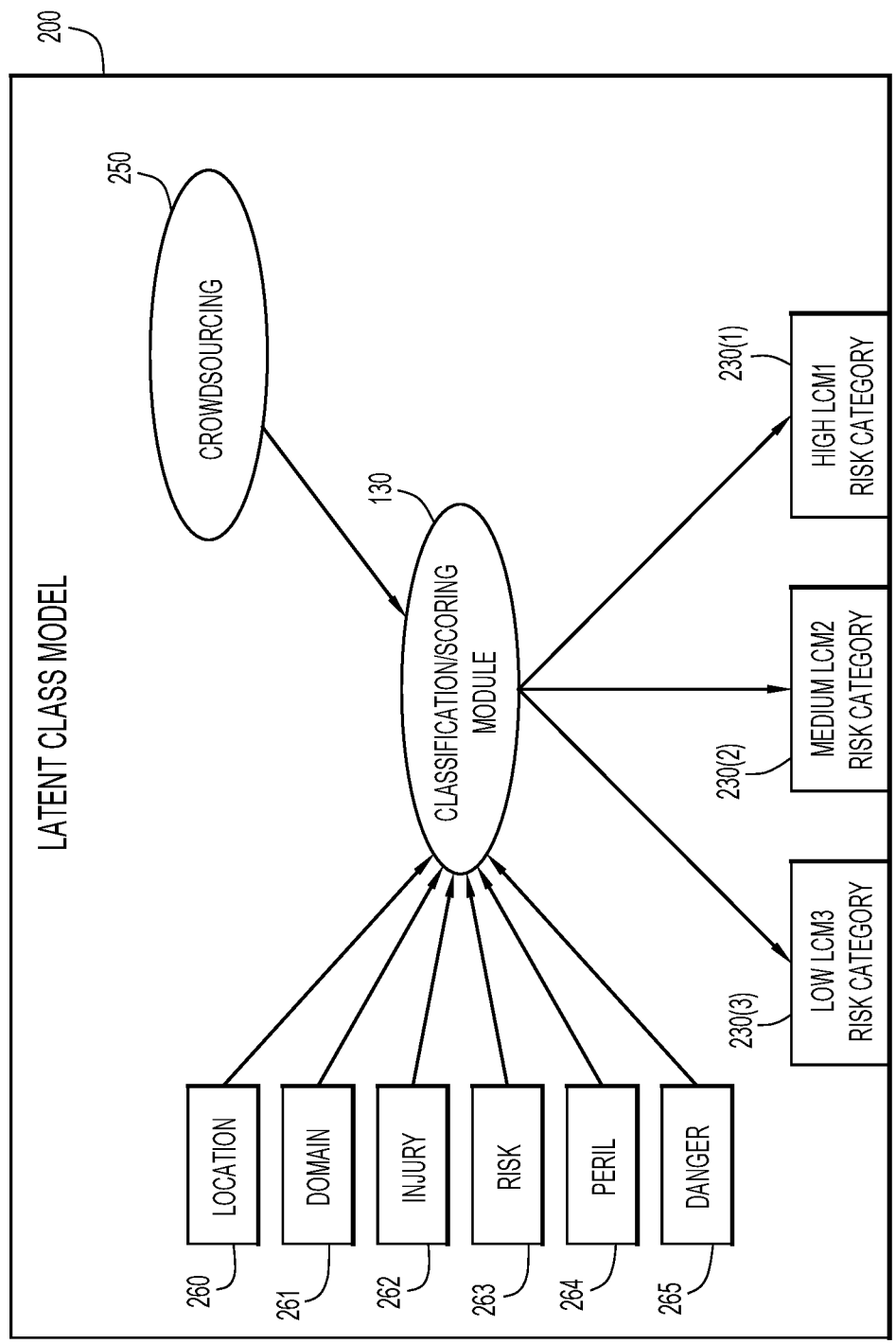
FIG. 2 is an illustration of a latent class model for identifying high risk images, according to embodiments of the present disclosure.

FIG. 2 shows an example illustration of latent class model 200 used to classify photos into one of a plurality of LCM risk categories 230(1)-230(3). Criteria for classifying the photos may be determined using classification/scoring module 130, which may classify the photo into a LCM risk category based on results of crowdsourcing module 250, which may be part of peer review module 105 and may receive inputs from other modules of cognitive image arbitration module 15. Photos may be classified into a high LCM1 risk category 230(1), a medium LCM2 risk category 230(2), or a low LCM3 risk category 230(3), based upon scoring by classification/scoring module 130, which may utilize training data 32, rules 34, and/or profiles 36 along with information from peer review module 105/crowdsourcing module 250, metadata analysis module 115, and geolocation module 120 to generate a score value.

Various factors may considered when assessing a problematic condition or degree of danger of a photo, including location 260, domain 261, injury 262, risk 263, peril 264, and/or danger 265. In general, the cognitive image arbitration module 15 may determine values for these factors during analysis and processing of the image. Location 260 may pertain to a precise location of a user, such as determined by a global positioning system (GPS). Domain 261 may pertain to a group of electronic devices, which may also be associated with a geographical location, such as a country, university, or company. Domain 261 may refer to a group of geographical locations, such as a neighborhood, a zip code, etc. In some instances, this information may be obtained from a mobile electronic device associated with the user. For example, a domain may be linked to a user via a mobile device, email, or other application.

Injury 262 may pertain to types of injuries that a user is at risk for based on the selfie. For example, a user determined to be on the exterior of a skyscraper may be subject to much more extensive injuries than a person on a first floor balcony. Risk 263 may pertain to uncertainty arising from the possible occurrence of an event that would lead to peril. Peril 254 may pertain to an event that causes loss or severe injury. Danger 265 may correspond to a condition that increases the probability of peril.

For example, during analysis of the submitted image by image processing/machine learning module 110, a peril, such as a wild animal, a hurricane, etc., may be identified in the image. Based on the estimated distance between the peril and the user, a risk 263 may then be determined. Based on analysis of the image, injury 262 may also be assessed.

In other cases, geolocation module 120 may provide information pertaining to injury 262 and/or risk 263. For example, users in a specified zip code may be at a higher risk of certain types of injuries than users in other zip codes.

In some cases, peers that are reviewing photos using peer system 40 may provide information pertaining to factors 260-265. For example, different ranges of risk may be presented to a peer during evaluation of the photo. A peer may identify a wild animal at the zoo as being low risk, but may identify a wild animal encountered while hiking as being high risk.

These factors 260-265 may be used to determine whether the user is in a dangerous location, whether the image is associated with an internet domain linked to a dangerous location, whether the user is in imminent danger or peril, or otherwise associated with risky behavior that may lead to injury. In this example, three LCM risk categories are shown, however, any number of risk categories (LCMs) are possible.

Figure 3:
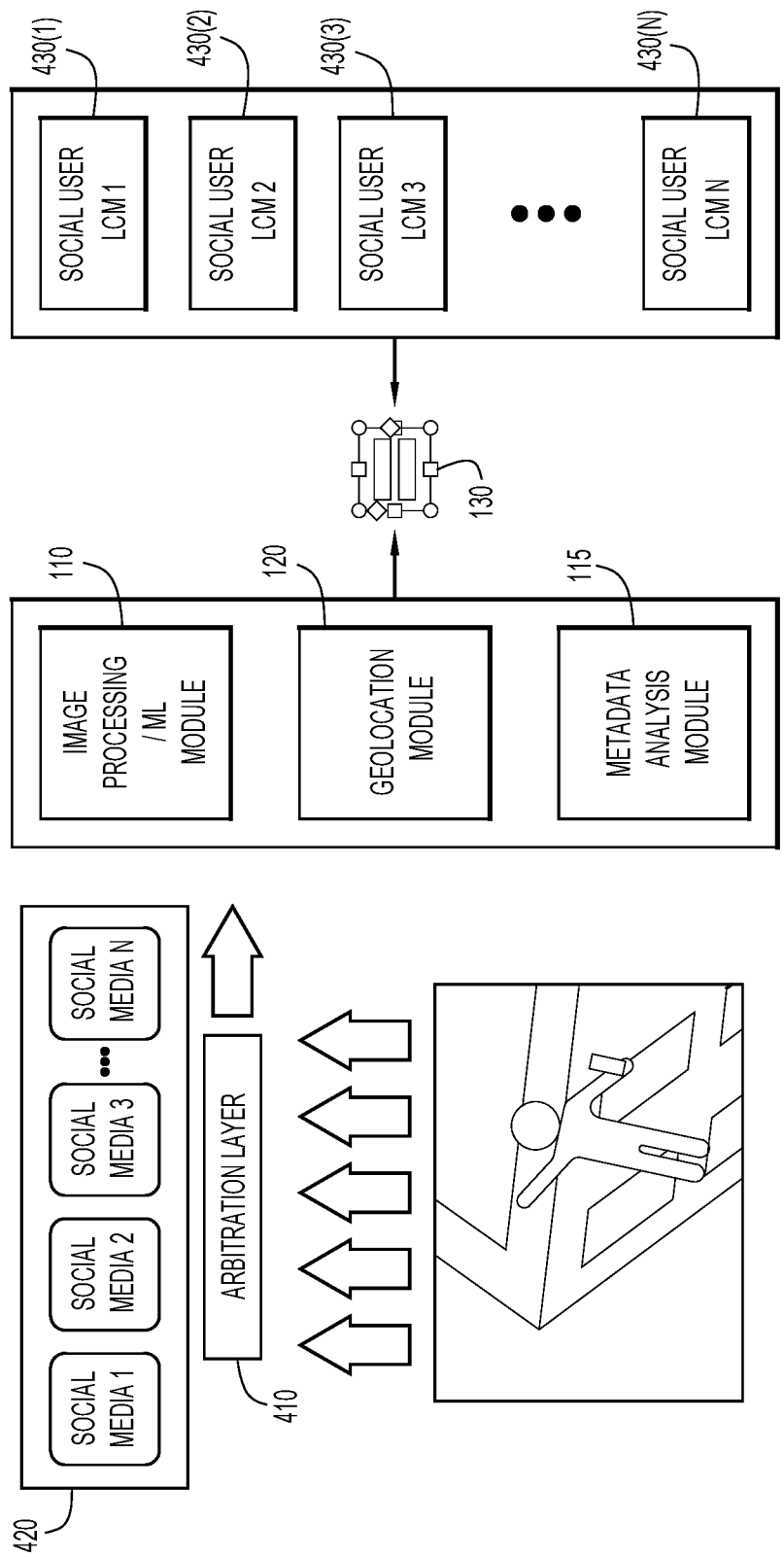
FIG. 3 is an illustration of an image analysis process for identifying high risk images, according to embodiments of the present disclosure.

FIG. 3 shows an example classification scheme for an image such as a selfie by cognitive image arbitration module 15. In this example, an image is submitted to an arbitration layer 410 for upload to a social media site 420 (Social media 1 . . . Social media N). The social media sites may include any suitable social media site, including but not limited to, Facebook®, Twitter®, Instagram®, Skype®, etc.

Several factors may be considered when determining which LCM risk category in which to classify the submitted photo. For example, in one embodiment, image processing/ machine learning module 110 may perform image analysis on the photo to classify the image based on a determined level of risk. For example, if the image is determined to contain dangerous weather events, such as flooding, earthquakes, tsunamis, volcanoes, hurricanes, tornadoes, etc., the system may mark the photo as including a problematic condition, and assign a score value greater than (or less than, depending on the configuration of the system) a threshold for classification into a high LCM1 risk category. Other examples may include presence of a wild animal determined to be proximal to an individual. In still other cases, an image of a user with an aerial perspective of a cityscape or a landscape in the background may be assigned a higher score value than a photo of a user with a ground level perspective of a cityscape or background.

Analysis may be based on comparison of the image to various profiles 430(1)-430(N), wherein the profiles correspond to LCM categories. Profiles may be generated by peer review, by machine learning techniques, or a combination thereof.

Metadata analysis module 115 may also be used to identify problematic conditions. For example, if the image is associated with an individual with numerous other images rejected due to the presence of problematic conditions, then the system may implement a custom threshold for this individual, such as a lower threshold, rather than a standard threshold for a user with no such history, for determining that an image from this particular individual is dangerous. In other aspects, a hashtag may be analyzed to determine risk. An example of a hashtag indicating risk may include the terms such as #extreme, #thrill, #dangerous, etc., and the image may receive a score value to result in classification of the image in the LCM1 high risk category.

In still other cases, location services/geolocation module 120 may be used to determine whether a photo is dangerous or not dangerous. For example, if a user is determined to be atop a structure without an observation deck, then geolocation module 120 may determine the user's location and assign the image with a high risk score value, leading to classification of the image in a high risk category and rejection of the photo. On the other hand, if a user is determined to be at ground level at the same location, the system may generate a risk score value indicating medium or low risk.

Machine learning classifications may improve over time as new training data, such as data from peer review, is generated and incorporated into a training data set to produce more accurate LCM models. For example, photos from users visiting a designated observation deck may be initially rejected. As the machine learning LCM is refined to account for exceptions at particular locations, the system may determine based on image similarity that submitted images associated with these locations are not high risk.

In some aspects, the uploaded image may be compared to a social cohort profile, such as social user LCM 1 430(1)-430(N), and may be classified into one of LCM categories 230(1)-230(N) based on the social cohort. In other aspects, the uploaded image may be compared to a social cohort profile, such as social user LCM 1 430(1)-430(N), and may be classified into one of LCM categories 230(1)-230(N) based on the social cohort and information from one or more of image processing/ML module 110, metadata analysis module 115, and geolocation module 120.

Classification/scoring module 130, may generate score values from aggregating scores from image processing/ machine learning module 110, metadata analysis module 115, and geolocation module 120, to generate a score value for classifying the photo into one of a plurality of LCM risk categories 230(1)-230(N). For example, an image score from image processing/ML module 110, a geolocation score from geolocation module 120, and a metadata score from metadata analysis module 115, for a respective image, may be aggregated to generate a score value for the image. In some aspects, each LCM category may be associated with a different range of score values, such that:

range of score values for classification into LCM risk category 230(1)> range of score values for classification into LCM risk category 230(2)> range of score values for classification into LCM risk category 230(3).

The score value that is the composite or aggregate of the image score value, the metadata score value, and the geolocation score value may determine which LCM risk category the photo is classified into.

Certain individuals, such as news media, police, or military personnel, may be exempted from this policy or may have customized policies. These individuals routinely place themselves into dangerous situations and may post dangerous photos as part of their occupational requirements. In some cases, accounts may be manually exempted from this policy, or a customized threshold (a higher threshold than a standard threshold) may be set in order to allow more photos to be accepted.

Figure 4:
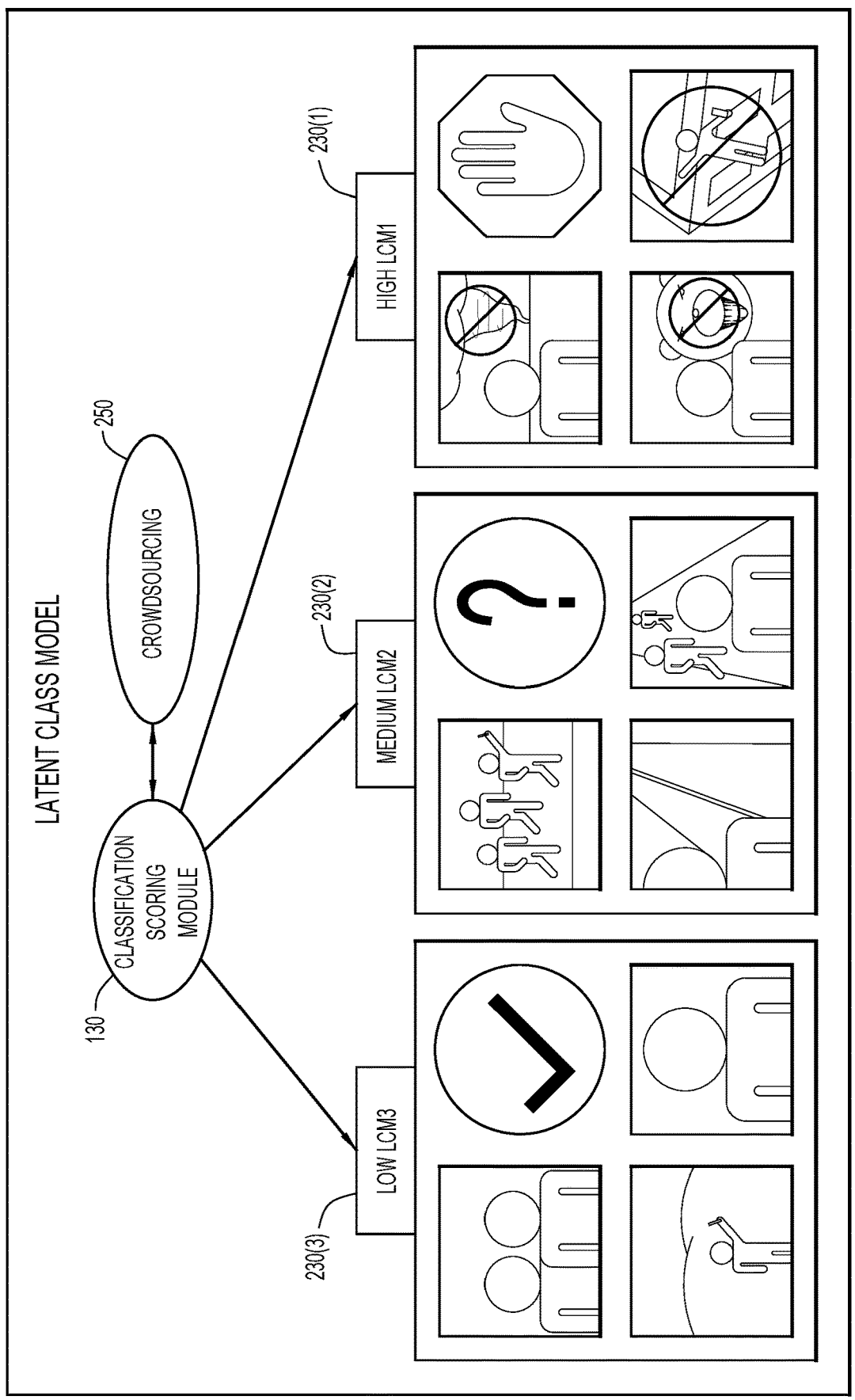
FIG. 4 is an illustration of image classification by a latent class model, according to embodiments of the present disclosure.

FIG. 4 shows example outputs of the classification/scoring module 130. Low danger or LCM3 class model 230(3) represents a class of images determined to have a low danger rating. Initially, classification may be performed according to profiles generated from a user's social cohort or from crowdsourcing module 250. As training data becomes available, a machine learning model may be trained to classify photos similar to the photos in this category as low risk. For example, low risk types of photos may include images predominantly comprised of people with limited background, people with domestic animals, people with background landscapes at a ground-level view, etc.

High LCM1 risk category 230(1) represents a class of images determined to have a high danger rating. These images are rejected for upload to a social media site. Initially, classification may be performed based on profiles generated from a user's social cohort or from crowdsourcing. As training data becomes available, a machine learning model may be trained to classify photos similar to the photos in this category as being high risk. For example, these types of photos may include images predominantly comprised of a user with an aerial view, a user with extreme weather events, a user with wild animals, etc. In some aspects, the upload of the captured image of the second user may be rejected in response to the score value being less than a threshold value. In other aspects, the upload of the captured image of the second user may be rejected in response to the score value being greater than a threshold value.

Medium LCM2 risk category 230(2) may comprise photos having a medium danger rating. These photos may include images in between low risk and high risk. Initially, classification may be performed using profiles generated from a user's social cohort or from crowdsourcing. As training data becomes available, the machine learning model may be trained to classify photos similar to the photos in this category as being medium risk. In some cases, the system may identify perspectives within the images, such as structures at eye-level view including people on streets or in crowds, etc., and may classify such images as being medium risk. As the machine learning model improves, some of these images may be reclassified as low or high risk.

If the individual believes that the photo has been misclassified by the system, the individual can submit the photo for additional review. In this case, an employee of a social media site or other service may receive a message indicating that the photo needs to be reviewed to determine whether the photo may be uploaded to a social media site.

Figure 5:
FIG. 5 is an illustration of a user interface rejecting upload of an image identified to be high risk, according to embodiments of the present disclosure.

FIG. 5 shows an example message that is presented to the user when the submitted image is rejected for upload to a social media site by the system. For example, the message may indicate that the image is considered to be a dangerous selfie, and may provide suggestions for retaking the photo to meet safety standards. In other embodiments, the user may submit the photo for additional review by a cohort of individuals, if the user determines that the photo has been erroneously classified as dangerous.

Figure 6:
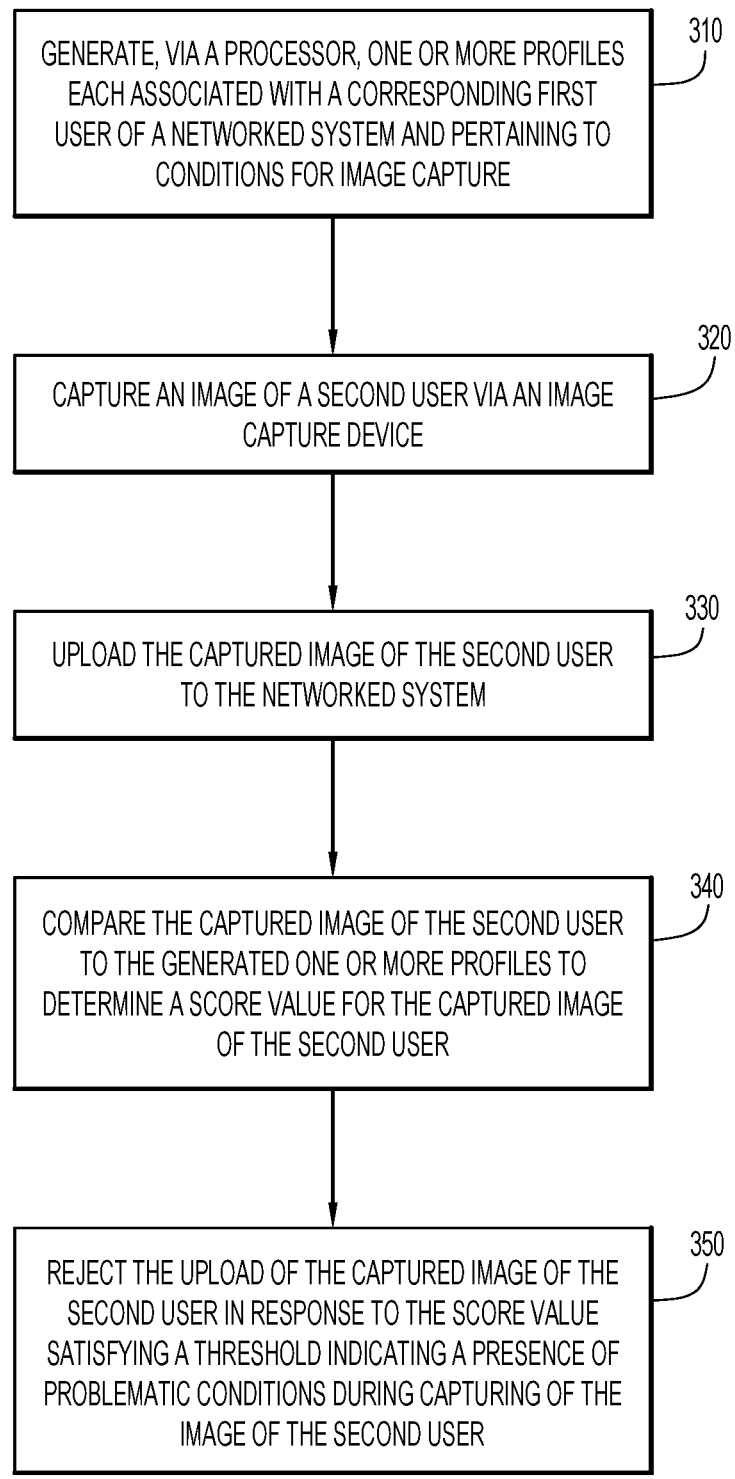
FIG. 6 is a flowchart of example operations for identifying high risk images, according to embodiments of the present disclosure.

FIG. 6 is a flow diagram showing operations for determining whether a captured image is suitable for upload onto a social media site, according to embodiments of the invention. At operation 310, one or more profiles are generated, with each profile associated with a corresponding first user of a networked system and pertaining to conditions for image capture. At operation 320, an image is captured of a second user via an image capture device. At operation 330, the captured image of the second user is uploaded to the networked system. At operation 340, the captured image of the second user is compared to the generated one or more profiles to determine a score value for the captured image of the second user. At operation 350, the upload of the captured image of the second user is rejected in response to the score value satisfying a threshold indicating a presence of problematic conditions during capturing of the image of the second user.

It will be appreciated that the embodiments described above and illustrated in the drawings represent only a few of the many ways of implementing embodiments for photo analysis and classification. The embodiments presented herein are not limited to a particular social media platforms, such as Facebook®, Twitter®, SnapChat®, Instagram®, etc., as the present techniques may be extended to any online application, including chat collaboration apps such as Slack®, Viber®, WhatsApp®, etc.

The environment of the present invention embodiments may include any number of computer or other processing systems, such as client or end-user systems, server systems, etc., and databases or other repositories arranged in any desired fashion, where the present invention embodiments may be applied to any desired type of computing environment, such as cloud computing, client-server, network computing, mainframe, stand-alone systems, etc.

The computer or other processing systems employed by present invention embodiments may be implemented by any number of any personal or other type of computer or processing system, such as desktop, laptop, PDA, mobile devices, etc., and may include any commercially available operating system and any combination of commercially available and custom software, such as browser software, server software, cognitive image arbitration module 15, image submission and results module 25, image scoring module 27, etc. These systems may include any types of monitors and input devices such as keyboard, mouse, voice recognition, etc., to enter and/or view information.

It is to be understood that the software, such as cognitive image arbitration module 15, image submission and results module 25, image scoring module 27, etc., of the present invention embodiments may be implemented in any desired computer language and could be developed by one of ordinary skill in the computer arts based on the functional descriptions contained in the specification and flow charts illustrated in the drawings. Further, any references herein of software performing various functions generally refer to computer systems or processors performing those functions under software control. The computer systems of the present invention embodiments may alternatively be implemented by any type of hardware and/or other processing circuitry.

The various functions of the computer or other processing systems may be distributed in any manner among any number of software and/or hardware modules or units, processing or computer systems and/or circuitry, where the computer or processing systems may be disposed locally or remotely of each other and communicate via any suitable communications medium, such as LAN, WAN, Intranet, Internet, hardwire, modem connection, wireless, etc. For example, the functions of the present invention embodiments may be distributed in any manner among the various end-user/client and server systems, and/or any other intermediary processing devices. The software and/or algorithms described above and illustrated in the flow charts may be modified in any manner that accomplishes the functions described herein. In addition, the functions in the flow charts or description may be performed in any order that accomplishes a desired operation.

The software of the present invention embodiments, such as cognitive image arbitration module 15, image submission and results module 25, image scoring module 27, etc., may be available on a non-transitory computer useable medium, such as magnetic or optical mediums, magneto-optic mediums, floppy diskettes, CD-ROM, DVD, memory devices, etc., of a stationary or portable program product apparatus or device for use with stand-alone systems or systems connected by a network or other communications medium.

The communication network may be implemented by any number of any type of communications network, such as LAN, WAN, Internet, Intranet, VPN, etc. The computer or other processing systems of the present invention embodiments may include any conventional or other communications devices to communicate over the network via any conventional or other protocols. The computer or other processing systems may utilize any type of connection, such as wired, wireless, etc., for access to the network. Local communication media may be implemented by any suitable communication media, such as local area network (LAN), hardwire, wireless link, Intranet, etc.

The system may employ any number of any conventional or other databases, data stores or storage structures, such as files, databases, data structures, data or other repositories, etc., to store information, such as training data 32, rules 34, profiles 36, image analysis results 38, etc. The database system may be implemented by any number of any conventional or other databases, data stores or storage structures, such as files, databases, data structures, data or other repositories, etc., to store information, such as training data 32, rules 34, profiles 36, image analysis results 38, etc. The database system may be included within or coupled to the server and/or client systems. The database systems and/or storage structures may be remote from or local to the computer or other processing systems, and may store any desired data, such as training data 32, rules 34, profiles 36, image analysis results 38, etc.

The present invention embodiments may employ any number of any type of user interface, such as Graphical User Interface (GUI), command-line, prompt, etc., for obtaining or providing information, such as training data 32, rules 34, profiles 36, image analysis results 38, etc., where the interface may include any information arranged in any fashion.

The interface may include any number of any types of input or actuation mechanisms, such as buttons, icons, fields, boxes, links, etc., disposed at any locations to enter/display information and initiate desired actions via any suitable input devices, such as mouse, keyboard, etc. The interface screens may include any suitable actuators, such as links, tabs, etc., to navigate between the screens in any fashion.

The report may include any information arranged in any fashion, and may be configurable based on rules or other criteria to provide desired information to a user, such as image analytics, image score values, etc.

The present invention embodiments are not limited to the specific tasks or algorithms described above, but may be utilized for any application which uploads content to a public online forum.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises", "comprising", "includes", "including", "has", "have", "having", "with" and the like, when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media, such as light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method, in a data processing system comprising at least one processor and at least one memory, the at least one memory comprising instructions executed by the at least one processor to cause the at least one processor to process an image comprising:
    generating, via a processor, one or more profiles each associated with a corresponding first user of a networked system and pertaining to problematic conditions for image capture, wherein the one or more profiles are generated in part based on classification of a plurality of images into respective risk categories by crowdsourcing users of the networked system;
    capturing an image of a second user via an image capture device;
    uploading, via the processor, the captured image of the second user to the networked system;
    comparing, via the processor, the captured image of the second user to the generated one or more profiles to determine a score value for the captured image of the second user, wherein the score value is a combination of a metadata score value, a geolocation score value, and an image score value based at least in part on a perspective of the captured image;
    classifying, based upon the score value, the captured image into one of a plurality of risk categories using a latent class model;
    in response to the classification:
        rejecting upload of the captured image of the second user, via the processor, in response to the classification of the captured image based at least in part on the score value satisfying a first threshold associated with a risk category indicating a presence of problematic conditions during capturing of the image of the second user;
        allowing upload of the captured image of the second user, via the processor, in response to classification of the captured image based at least in part on the score value satisfying a second threshold associated with a risk category indicating an absence of problematic conditions during capturing of the image of the second user; and
        providing, when the score value falls in between the first threshold and the second threshold, the captured image to a peer group to determine whether to classify the captured image into a risk category indicating a presence of problematic conditions or a risk category indicating an absence of problematic conditions.

2. The method of claim 1, wherein the networked system includes a social media network.

3. The method of claim 1, further comprising:
    providing feedback to avoid the problematic conditions in response to rejecting the upload of the captured image of the second user.

4. The method of claim 1, wherein rejecting the upload of the captured image of the second user further comprises:
    rejecting the upload of the captured image of the second user in response to the score value being less than a first threshold value.

5. The method of claim 1, wherein a profile associated with a corresponding first user includes one or more from a group of a list of keywords and sample images captured during a presence of problematic conditions.

6. The method of claim 1, wherein generating the one or more profiles further comprises:
    generating a latent class model to define images captured in the presence of problematic conditions.

7. The method of claim 1, wherein the captured image of the second user is a self-image of the second user.

8. The method of claim 1, further comprising:
    generating machine learning models based on the one or more profiles, and
    determining based on the machine learning models the score value for the captured image.

9. The method of claim 1, wherein the threshold is customized based on characteristics of the second user, the characteristics comprising one or more selected from the group consisting of an occupation of the second user and a history of uploading photos with problematic conditions by the second user.

10. A system for image arbitration comprising at least one processor configured to:
  generate one or more profiles each associated with a corresponding first user of a networked system and pertaining to problematic conditions for image capture, wherein the one or more profiles are generated in part based on classification of a plurality of images into respective risk categories by crowdsourcing users of the networked system;
  capture an image of a second user via an image capture device;
  upload the captured image of the second user to the networked system;
  compare the captured image of the second user to the generated one or more profiles to determine a score value for the captured image of the second user, wherein the score value is a combination of a metadata score value, a geolocation score value, and an image score value based at least in part on a perspective of the captured image;
  classifying, based upon the score value, the captured image into one of a plurality of risk categories using a latent class model;
  in response to the classification:
    reject upload of the captured image of the second user in response to the classification of the captured image based at least in part on the score value satisfying a first threshold associated with a risk category indicating a presence of problematic conditions during capturing of the image of the second user;
    allow upload of the captured image of the second user, via the processor, in response to classification of the captured image based at least in part on the score value satisfying a second threshold associated with a risk category indicating an absence of problematic conditions during capturing of the image of the second user; and
    provide, when the score value falls in between the first threshold and the second threshold, the captured image to a peer group to determine whether to classify the captured image into a risk category indicating a presence of problematic conditions or a risk category indicating an absence of problematic conditions.

11. The system of claim 10, wherein the networked system includes a social media network.

12. The system of claim 10, wherein a profile associated with a corresponding first user includes one or more from a group of a list of keywords and sample images captured during a presence of problematic conditions.

13. The system of claim 10, wherein the processor is further configured to:
  generate a latent class model to define images captured in the presence of problematic conditions.

14. The system of claim 10, wherein the captured image of the second user is a self-image of the second user.

15. The system of claim 10, wherein the processor is further configured to:
  generate machine learning models based on the one or more profiles, and
  determine based on the machine learning models the score value for the captured image.

16. A computer program product for image arbitration, the computer program product comprising one or more computer readable storage media collectively having program instructions embodied therewith, the program instructions executable by a processor to:
  generate one or more profiles each associated with a corresponding first user of a networked system and pertaining to problematic conditions for image capture, wherein the one or more profiles are generated in part based on classification of a plurality of images into respective risk categories by crowdsourcing users of the networked system;
  capture an image of a second user via an image capture device;
  upload the captured image of the second user to the networked system;
  compare the captured image of the second user to the generated one or more profiles to determine a score value for the captured image of the second user, wherein the score value is a combination of a metadata score value, a geolocation score value, and an image score value based at least in part on a perspective of the captured image;
  classifying, based upon the score value, the captured image into one of a plurality of risk categories using a latent class model;
  in response to the classification:
    reject upload of the captured image of the second user in response to the classification of the captured image based at least in part on the score value satisfying a first threshold associated with a risk category indicating a presence of problematic conditions during capturing of the image of the second user;
    allow upload of the captured image of the second user, via the processor, in response to classification of the captured image based at least in part on the score value satisfying a second threshold associated with a risk category indicating an absence of problematic conditions during capturing of the image of the second user; and
    provide, when the score value falls in between the first threshold and the second threshold, the captured image to a peer group to determine whether to classify the captured image into a risk category indicating a presence of problematic conditions or a risk category indicating an absence of problematic conditions.

17. The computer program product of claim 16, wherein the program instructions are executable to:
  generate machine learning models based on the one or more profiles, and
  determine based on the machine learning models the score value for the captured image.

* * * * *